Figure 3:
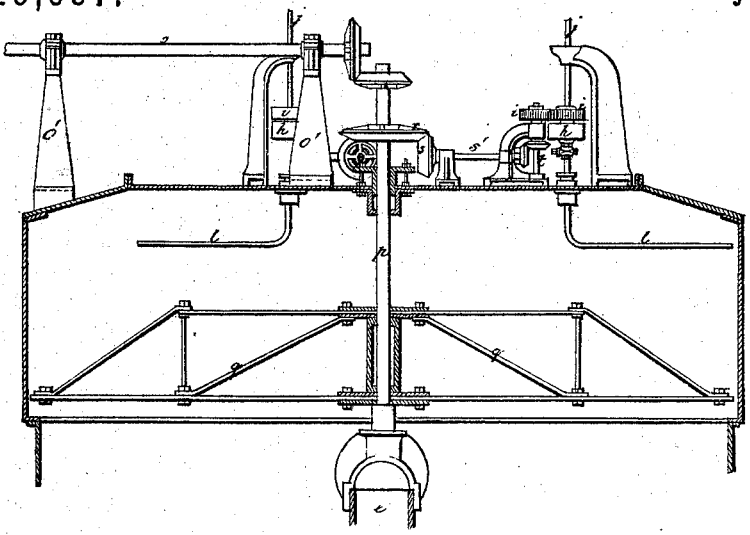

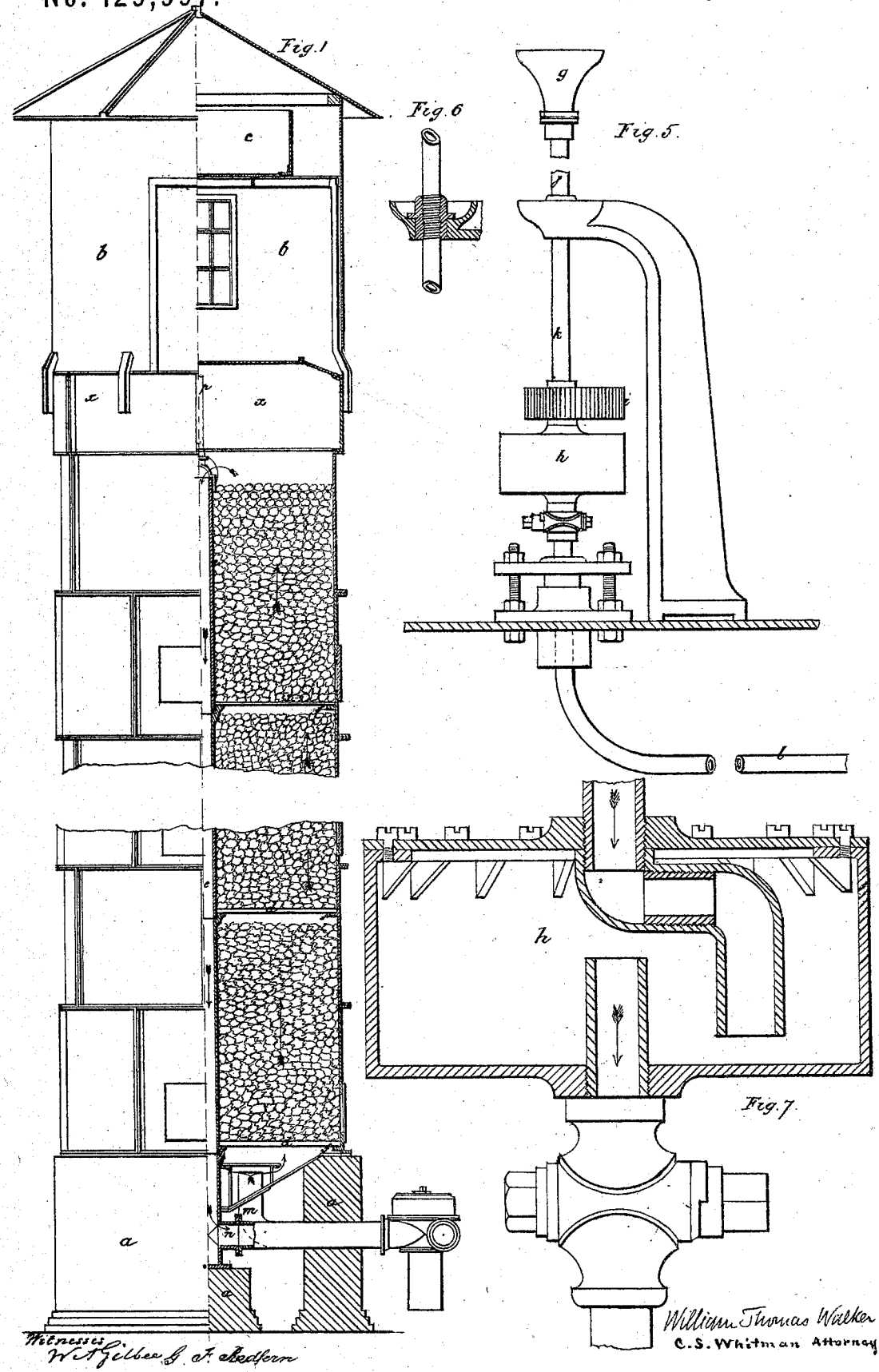

W. T. WALKER.
Improvement in Apparatus for Purifying Gas.
No. 129,997. Patented July 30, 1872.

Witnesses
William Thomas Walker
C. S. Whitman Attorney

W. T. WALKER.
Improvement in Apparatus for Purifying Gas.
No. 129,997. Patented July 30, 1872.

3 Sheets--Sheet 3.

UNITED STATES PATENT OFFICE.

WILLIAM THOMAS WALKER, OF LONDON, ENGLAND.

IMPROVEMENT IN APPARATUS FOR PURIFYING GAS.

Specification forming part of Letters Patent No. 129,997, dated July 30, 1872.

Specification describing certain Improvements in Apparatus used in Gas-Works for Cleansing and Purifying Gas from Ammonia and other Impurities, invented by WILLIAM THOMAS WALKER, of London, England.

In the accompanying drawing, Figure 1, Sheet 1, is a part elevation, half in section, of the exterior of my improved apparatus or scrubber standing upon its foundations $a\ a$, and shown as being formed of separate cast-iron plates. It can be made of separate cast-iron cylinders, placed one upon another, or of wrought-iron plates riveted together. It will be seen that the top of the scrubber is enlarged, and the whole closed in by a small house, $b$, the framing of which is formed by wrought T or other shaped iron uprights fixed to the sides of the enlarged top $x$ of the scrubber, and carried up to the height of the bottom of the water-tank $c$, where they are united by a wrought-iron curb-ring, which, by means of transverse bars, carries the water-tank and forms a frame for covering in the building. It will be seen that the bottom of the scrubber is concave, instead of flat, as usual, to enable the ammoniacal liquor, which is very strong, and in some cases very volatile, to be at once discharged out of the scrubber, on reaching the bottom, into a self-acting siphon placed on the left-hand side, (not shown in the drawing,) and thence into air-tight tanks or proper receptacles prepared for it. In the scrubber there are six tiers of gratings or sieves, $d$, formed of cast-iron, wrought-iron, or wood, and upon these gratings coke, by preference, is placed for giving a scrubbing or washing surface. The tiers or columns of coke are each about eight feet deep, and placed upon the six gratings $d$; but a larger or smaller number may be employed. The gratings $d$ are supported in the middle by the center column $e$, which likewise forms the outlet of the purified gas, and they are supported upon the sides of the scrubber by strong cast-iron lugs $f$ in place of shelves; the object of this improvement being to let the ammoniacal water or liquor flow down the sides of the scrubber without the interruption or impediments presented by projecting shelves. The drawing shows the enlarged part of the scrubber at the top which receives the machinery (shown in a detached view, Figs. 3 and 4, Sheet 2) and water-tank for feeding the scrubber inclosed inside the house. The scrubber thus forms its own water-tower, and supports the whole of its machinery and water-supply tank, and covers in the whole from the effects of the weather. By these improvements I avoid the expense of a separate water-tower to feed the scrubber.

Fig. 3, Sheet 2, shows a view on a larger scale of the machinery inside the enlarged top of the scrubber, at a point immediately below that at which the tubes from the water-tank discharge into the funnels or receivers $g\ g$, of which there are three shown on Fig. 4, Sheet 2, which is a plan of the top of the scrubber inside the house.

Figure 2:
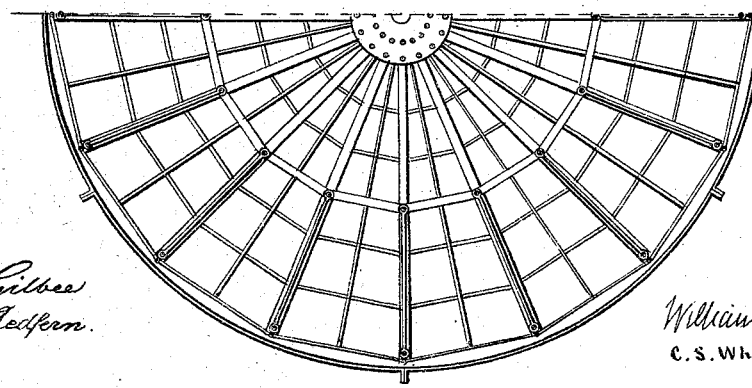

Fig. 2, Sheet 2, is a half plan of the circular revolving horizontal frame supporting the brushwood, showing the construction of the frame.

Fig. 5, Sheet 1, is a side elevation on a larger scale, showing my improved construction of water-receiver, with its funnel $g$ on the top, and supported by the standard shown. The junction of the vertical supply-tube is shown at Fig. 6, Sheet 1, where it forms an oil-cup also. An eccentric wheel, $i$, is fixed on the vertical tube $k$, and what I term a water-seal box, $h$, beneath it. The tube descends from this box into the interior of the scrubber, with its revolving arm $l$ inside.

Fig. 7, Sheet 1, shows an enlarged section of my improved water-seal box.

Figure 8:
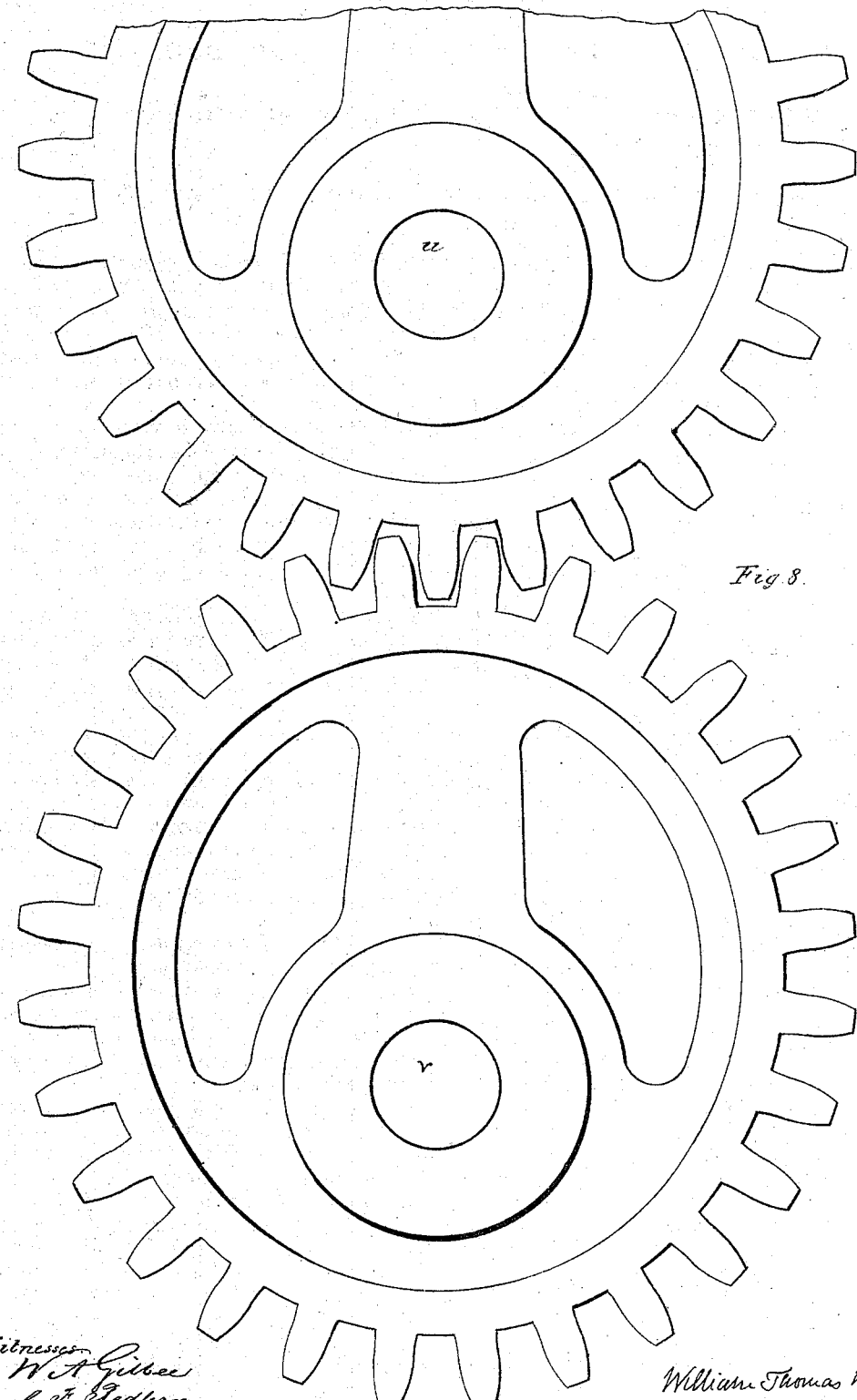

Fig. 8, Sheet 3, is a plan of my improved construction and arrangement of eccentric wheels, part of one of the wheels being broken off. $u$ is the hole for the vertical shaft, and $v$ the hole for the water-tube.

Referring again to Fig. 1, Sheet 1, the scrubber therein shown is supposed to be about sixty feet high in its working parts, and having six columns of coke, as before described. Foul gas highly charged with ammonia is admitted at the bottom by the inlet-pipe $m$, passes upward, and circulates through the whole of the coke in the direction shown by the arrows, which coke is kept wetted and soaked by minute streams of clear water successively renewed, and kept falling in showers by the machinery at the top of the scrubber. By the time the foul gas reaches the top of the scrubber and is ready to pass down the outlet-pipe $e$, as shown by the arrows, it will have become purified from ammonia, the whole of which will have been taken up and discharged out of the bottom of the scrubber.

Figure 4:
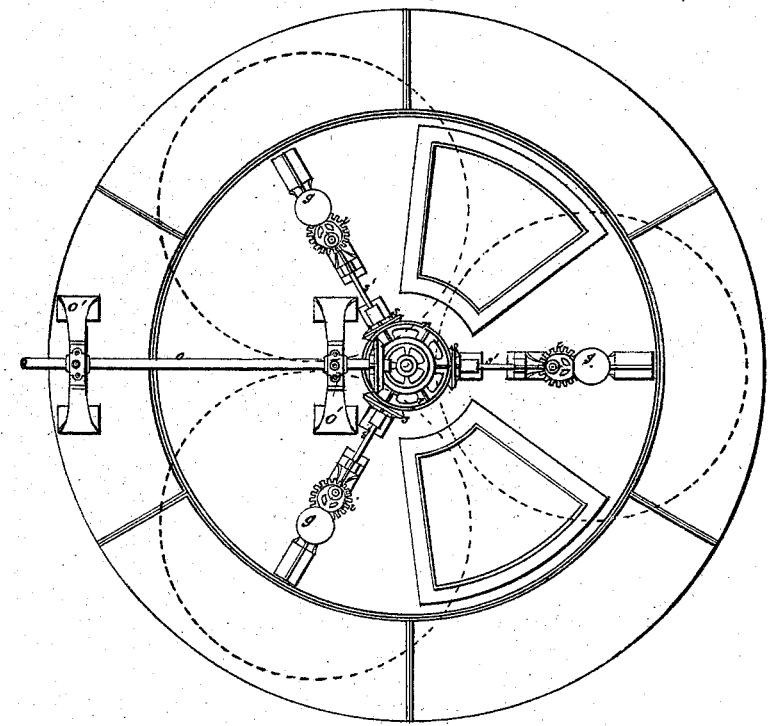

Proceeding to further describe the improved water-spreading machinery, and referring to Figs. 3 and 4, Sheet 2, motive power is transmitted to the horizontal shaft $o$, which is supported upon vertical standards $o'$, and which has a toothed wheel at its extremity gearing into a horizontal toothed wheel on the vertical shaft $p$, causing it to revolve slowly—that is to say, about two or three revolutions per minute—and carrying with it the circular wrought-iron frame $q$, shown in half plan, Fig. 5, Sheet 2. The horizontal frame $q$, revolving as hereinbefore described, is filled with brush-wood, which is laid in regular layers upon it, and then securely bound and attached to the circular frame, which, by the enlargement of the top hereinbefore described, overlaps the bore or inside diameter of the scrubber. Upon the vertical shaft $p$ a horizontal toothed wheel, $r$, is fixed, and as the vertical shaft $p$ revolves, as before described, motion is given, by the wheel $r$, to three other wheels, $s\ s\ s$, which gear into it. These three wheels give motion to three horizontal shafts having wheels at their outer ends, each of which gears into another wheel on the vertical spindles $t$, upon each of which is fixed a horizontal eccentric wheel, gearing into another similar eccentric wheel, $r$, fixed upon the water-tube. These wheels are shown on a larger scale at Fig. 8, Sheet 3. The water-tubes, of which there are three shown, pass through stuffing-boxes into the interior of the scrubber.

The mode of action of the improved water-spreading machinery is as follows: The cocks of the three outlet-tubes from the water-tank $c$, Fig. 1, Sheet 1, are opened, and the water is admitted into the three funnels $g$ of the vertical tubes, down which it passes into the water-seal box $h$, shown in detail, Fig. 7, Sheet 1; thence, overflowing, it passes down the tube in the center into the inside of the scrubber, whence it is discharged onto the revolving brush-wood as the arms $l$ revolve. The water-seal box contains sufficient water to seal the vertical pipe $k$. In this way the water is conveyed to the interior of the scrubber and discharged at the ends of the three revolving arms $l$ onto the revolving brush-wood. Now, as the outer surface of the space near the sides of the scrubber is much larger than the part toward the center, the revolving arms $l$ are made to travel slowly over their outer paths, as shown by dotted lines, Fig. 4, Sheet 2, by means of the outer peripheries and teeth of the eccentric wheels $i$, by which the tubes are turned around, distributing a larger quantity of water at the part where the surface requires it, and in like manner a less quantity where needed.

By these improved arrangements I effect a distribution of water so well regulated that the scrubber is fed with the smallest quantity of water necessary to take up all the ammonia. This comparatively small quantity of water becomes, as it descends in the scrubber, a highly-concentrated solution of ammonia, valuable as a marketable commodity, and producing a large profit upon gas-works, and which, being presented in a proper state of division, acts as a solvent for and takes up the bisulphide of carbon and other impurities and acids which it has been found impracticable until now to remove from coal-gas.

I claim as my invention—

1. The machinery or combination of machinery by which I am enabled to effect the distribution of the smallest quantity of water necessary, and consisting of the crown-wheel $r$ on the shaft $p$, gearing-wheels $s\ s\ s$, the shafts $s'\ s'\ s'$, their outer wheels, vertical spindles $t$ and wheels, and eccentric differential wheels $i$, by which the revolving arms $l$ are caused to travel at various speeds, according to their position, and whereby a less diluted solution of ammonia is produced, substantially in the manner hereinbefore described, and represented in the accompanying drawing.

2. The novel water-seal box $h$, by which I am enabled to lessen the height of the water-receiving tubes $j$ and funnels $g$, and causing them to work easier and steadier, while the interior is rendered more accessible, substantially as hereinbefore described, and represented in Fig. 7, Sheet 1.

3. The making the bottom of the scrubber concave instead of flat, and the top with an enlargement, $x$, and using lugs $f$ as bearers to keep the sides of the scrubber clear for the passage of liquid running down the sides, as hereinbefore described, and represented in Fig. 1, Sheet 1, of the drawing.

4. The construction of the scrubber with its own water-tank and covering in the top of the scrubber, as hereinbefore described, and represented in Fig. 1, Sheet 1, of the accompanying drawing.

In testimony whereof I, the said WILLIAM THOMAS WALKER, have hereto set my hand and affixed my seal this 19th day of March, one thousand eight hundred and seventy-two.

WILLIAM THOMAS WALKER. [L. S.]

Witnesses:
  W. A. GILBRE,
  G. F. REDFERN.